(12) United States Patent
Endo et al.

(10) Patent No.: US 8,548,700 B2
(45) Date of Patent: Oct. 1, 2013

(54) CONTROL SYSTEM OF AUTOMATIC TRANSMISSION

(75) Inventors: Go Endo, Yokohama (JP); Masami Suzuki, Mishima (JP)

(73) Assignee: Jatco Ltd, Fuji-shi (JP)

( * ) Notice: Subject to any disclaimer, the term of this patent is extended or adjusted under 35 U.S.C. 154(b) by 393 days.

(21) Appl. No.: 12/946,443

(22) Filed: Nov. 15, 2010

(65) Prior Publication Data

US 2011/0118947 A1    May 19, 2011

(30) Foreign Application Priority Data

Nov. 18, 2009    (JP) .................................. 2009-262726

(51) Int. Cl.
*B60K 15/00*    (2006.01)
(52) U.S. Cl.
USPC ............................................ 701/59; 475/120
(58) Field of Classification Search
USPC .................... 701/51, 59; 477/155, 156, 164, 477/166, 174, 175, 179–181; 475/120, 123, 475/125, 127, 128
See application file for complete search history.

(56) References Cited

U.S. PATENT DOCUMENTS

| | | | |
|---|---|---|---|
| 5,776,030 A | 7/1998 | Minowa et al. | |
| 5,782,711 A | 7/1998 | Tsutsui et al. | |
| 5,954,776 A * | 9/1999 | Saito et al. | 701/51 |
| 6,666,794 B2 * | 12/2003 | Yuasa et al. | 477/117 |
| 7,130,733 B2 * | 10/2006 | Mussaeus et al. | 701/55 |
| 2005/0092073 A1 | 5/2005 | Jeon | |

FOREIGN PATENT DOCUMENTS

| | | |
|---|---|---|
| EP | 0 780 602 A2 | 6/1997 |
| JP | 09-170654 A | 6/1997 |

* cited by examiner

*Primary Examiner* — Dalena Tran
(74) *Attorney, Agent, or Firm* — Foley & Lardner LLP (57)  ABSTRACT

A control system for controlling an automatic transmission that is capable of establishing a given speed stage by engaging a given frictional element. The control system comprises an actual time lag measuring section that measures an actual time lag from the time when a speed change instruction for the given speed stage is issued to the time when a gear ratio of the automatic transmission starts to change for the purpose of establishing the given speed stage, a torque detecting section that detects a torque from an engine, a time lag map that provides a suitable time lag in accordance with the detected torque from the engine, a learning correction section that corrects, by learning control, an instruction value for the hydraulic pressure led to the frictional element in a manner to cause the actual time lag to have the same value as the suitable time lag; and a time lag map correcting section that corrects the suitable time lag in accordance with an operation condition of an associated motor vehicle.

13 Claims, 6 Drawing Sheets

FIG.2

|  | B1 Fr/B | C1 I/C | C2 D/C | C3 H&RL/C | B2 LOW/B | B3 2346/B | B4 R/B | F1 | F2 |
|---|---|---|---|---|---|---|---|---|---|
| 1ST | (○) |  |  | (○) | ○ |  |  | ○ | ○ |
| 2ND |  |  |  | (○) | ○ | ○ |  |  | ○ |
| 3RD |  |  | ○ |  | ○ | ○ |  |  |  |
| 4TH |  |  | ○ | ○ |  | ○ |  |  |  |
| 5TH |  | ○ | ○ | ○ |  |  |  |  |  |
| 6TH |  | ○ |  | ○ |  | ○ |  |  |  |
| 7TH | ○ | ○ |  | ○ |  |  |  | ○ |  |
| REV. | ○ |  |  | ○ |  |  | ○ |  |  |

$$Tin = Te \times t$$
$$Te = \tau \times Ne^2 \qquad e = (Nt / Ne)$$
$$I (dNe / dt) = Tt - \tau \times Ne^2$$
$$I = Ie + Itc$$

FIG.8

CONTROL SYSTEM OF AUTOMATIC TRANSMISSION

BACKGROUND OF THE INVENTION

1. Field of the Invention

The present invention relates in general to control systems of automatic transmissions, and more particularly to control systems of stepwise variable automatic transmissions.

2. Description of the Related Art

In order to clarify the features of the present invention, the control system disclosed in Japanese Laid-open Patent Application (Tokkaihei) 9-170654 will be briefly described in the following.

In the Laid-open Patent Application, there is disclosed a control system that controls operation of a stepwise variable automatic transmission with the aid of learning control. In the control system, a piston stroke time needed for completion of engagement of a given frictional element, such as clutch, brake or the like, is detected or derived, and if the detected piston stroke time shows a value suitable for controlling or suppressing a shift shock, OK judgment is issued, while if the detected piston stroke time shows a value other than the suitable time, the instruction value for a hydraulic pressure to the frictional element is corrected by means of a learning control to cause the piston stroke time to show the suitable value. For ease of description, correction by means of learning control will be referred to "learning correction" in the following.

For designing an automatic transmission that carries out a learning correction like the learning correction as disclosed in the above-mentioned Japanese laid-open Patent Application, a map (viz., learning correction map) is provided which shows a relation between engine torque data received from an engine controller and predetermined piston stroke times. With practical usage of the learning correction map, the learning correction is carried out in accordance with an operation condition of an associated motor vehicle.

SUMMARY OF THE INVENTION

However, if the learning correction map is provided on the assumption that a shift instruction is issued based on a common shift map, the following drawbacks tend to occur.

That is, if a shift is carried out in a speed ratio range of the torque converter that is smaller than a desired speed ratio range, it often happens that a torque larger than a value (or torque) determined by the engine torque data is fed to the automatic transmission, which causes an erroneous learning by the control system.

It is therefore an object of the present invention to provide a control system of an automatic transmission, which is able to suppress or at least minimize a shift shock by carrying out a stable learning correction avoiding the effect of a torque converter.

That is, in accordance with the present invention, there is provided a control system for controlling an automatic transmission. The automatic transmission is mounted in a motor vehicle and arranged to receive a torque from an engine through a torque converter. The automatic transmission is capable of establishing a given speed stage by engaging a given frictional element. The control system comprises an actual time lag measuring section that measures an actual time lag from the time when a speed change instruction for the given speed stage is issued to the time when a gear ratio of the automatic transmission starts to change for the purpose of establishing the given speed stage, a torque detecting section that detects the torque from the engine, a time lag map that provides a suitable (or suitable) time lag in accordance with the detected torque from the engine, a learning correction section that corrects, by learning control, an instruction value for the hydraulic pressure led to the frictional element in a manner to cause the actual time lag to have the same value as the suitable (or reference) time lag, and a time lag map correcting section that corrects the suitable (or reference) time lag of the time lag map in accordance with an operation condition of the motor vehicle.

With the above-mentioned features of the control system of the present invention, the following advantageous effects are obtained.

As is known, under movement of the motor vehicle, it sometimes occurs that the speed ratio (viz., ratio in speed between impeller and turbine) of the torque converter shows a value smaller than a desired ratio and thus the torque capacity coefficient of the torque converter shows a higher value. In such case, the rotation speed of the engine can not be easily increased, and thus, the variation in the rotation speed of the engine is relatively small. Accordingly, in such case, an inertia torque of the torque converter is small as compared with that provided when the speed ratio of the torque converter is high, and thus the torque actually fed to the automatic transmission is large.

However, in the present invention, the suitable (or reference) time lag provided by the time lag map is corrected in accordance with an operation condition of an associated motor vehicle. Accordingly, even if the automatic transmission is forced to receive such a larger torque causing increase in the time lag, erroneous learning on the instruction value for the hydraulic pressure fed to the frictional element is assuredly suppressed, and thus, undesired shift shock can be assuredly suppressed or at least minimized.

In accordance with a first aspect of the present invention, there is provided a control system for controlling an automatic transmission that is mounted in a motor vehicle and receives a torque from an engine through a torque converter, the automatic transmission being capable of establishing a given speed stage by engaging a given frictional element. The control system comprises an actual time lag measuring section that measures an actual time lag from the time when a speed change instruction for the given speed stage is issued to the time when a gear ratio of the automatic transmission starts to change for the purpose of establishing the given speed stage; a torque detecting section that detects the torque from the engine; a time lag map that provides a suitable (or reference) time lag in accordance with the detected torque from the engine; a learning correction section that corrects, by learning control, an instruction value for the hydraulic pressure led to the frictional element in a manner to cause the actual time lag to have the same value as the suitable (or reference) time lag; and a time lag map correcting section that corrects the suitable (or reference) time lag in accordance with an operation condition of the vehicle.

In accordance with a second aspect of the present invention, there is provided a control system for controlling an automatic transmission that is mounted in a motor vehicle and receives a torque from an engine through a torque converter, the automatic transmission being capable of establishing a given speed stage by engaging a given frictional element. The control system comprises an actual time lag measuring section that measures an actual time lag from the time when a speed change instruction for the given speed stage is issued to the time when a gear ratio of the automatic transmission starts to change for the purpose of establishing the given speed stage; a torque detecting section that detects the torque from the engine; a time lag map that provides a suitable (or reference) time lag in accordance with the detected torque from the engine; a learning correction section that corrects, by learning control, an instruction value for the hydraulic pressure led to the frictional element in a manner to cause the actual time lag to have the same value as the suitable (or reference) time lag; a normal shift map that shows shift lines of a normal shift mode that are set to issue a speed change instruction for the given speed stage in accordance with a vehicle speed and an accelerator pedal depressed degree; an eco-shift map that shows shift lines of an eco-shift mode that are set to issue the speed change instruction for the given speed stage at a lower vehicle speed than the normal shift mode; a shift map switching section that switches the shift map from the normal shift map to the eco-shift map when a predetermined condition is established; and a correcting section that, when the eco-shift map is selected by the switching, corrects the contents of the time lag map in such a manner that when the rotation speed of a turbine of the torque converter is low, the suitable (or reference) time lag shows a larger value than that shown when the rotation speed of the turbine of the torque converter is high.

In accordance with a third aspect of the present invention, there is provided a control system for controlling an automatic transmission that is mounted in a motor vehicle and receives a torque from an engine through a torque converter, the automatic transmission being capable of establishing a given speed stage by engaging a given frictional element. The control system comprises an actual time lag measuring section that measures an actual time lag from the time when a speed change instruction for the given speed stage is issued to the time when a gear ratio of the automatic transmission starts to change for the purpose of establishing the given speed stage; a torque detecting section that detects the torque from the engine; a time lag map that provides a suitable (or reference) time lag in accordance with the detected torque from the engine; a learning correction section that corrects, by learning control, an instruction value for the hydraulic pressure led to the frictional element in a manner to cause the actual time lag to have the same value as the suitable (or reference) time lag; an engine rotation speed increasing rate detecting section that detects an increasing rate of the engine rotation speed; and a correcting section that corrects the contents of the time lag map in such a manner that when the detected engine rotation speed increasing rate is small, the suitable (or reference) time lag shows a larger value than that shown when the detected engine rotation speed increasing rate is large.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

In the following, the present invention will be described in detail with reference to the accompanying drawings.

Figure 1:
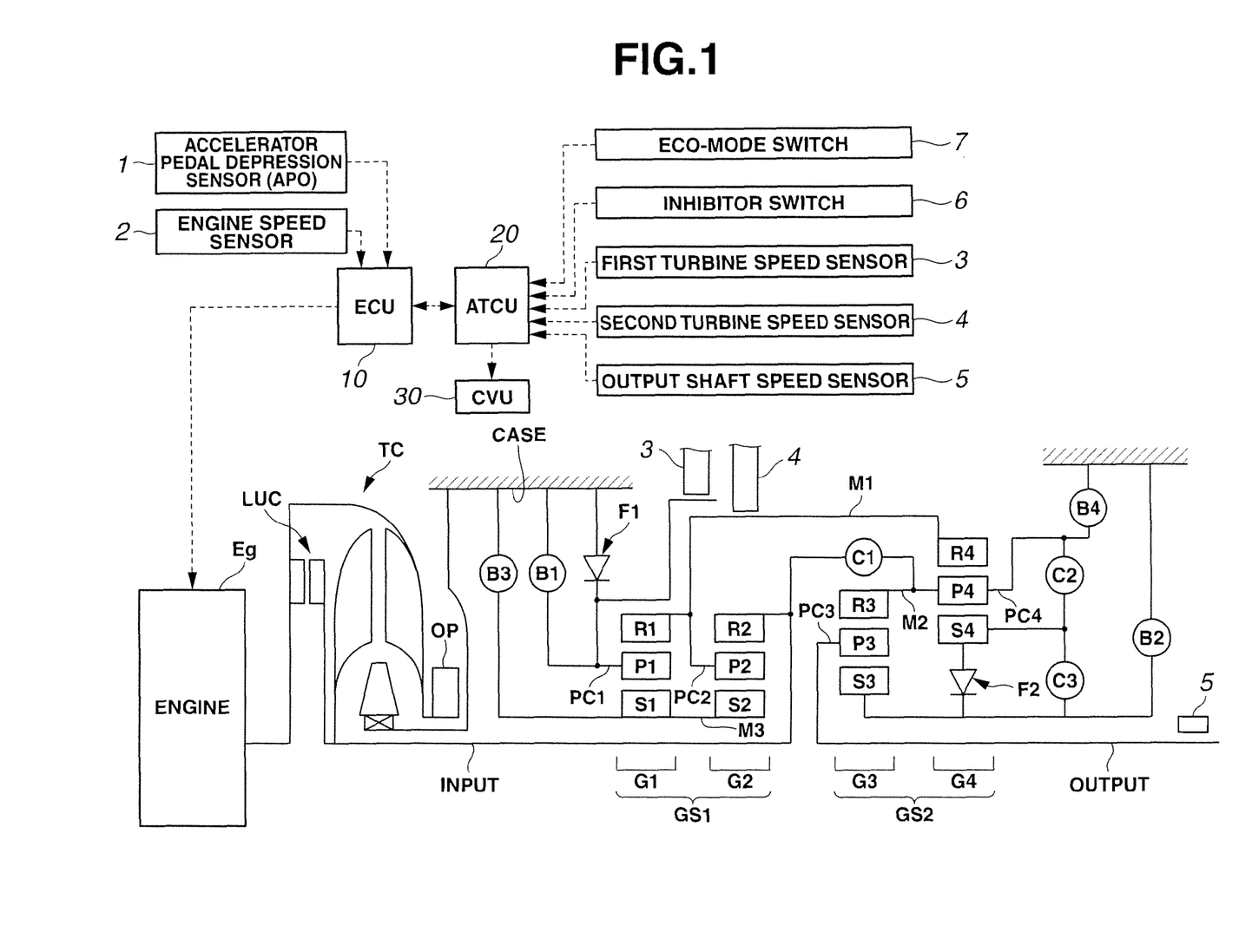
FIG. 1 is a diagrammatic sketch of an automatic transmission to which a control system of the present invention is practically applied.

Referring to FIG. 1, there is shown a diagrammatic sketch of an automatic transmission to which a control system of the present invention is practically applied.

The automatic transmission shown in FIG. 1 is of a stepwise variable automatic type having seven forward speeds and one reverse.

As is seen from the drawing of FIG. 1, a driving force (viz., engine torque) of an engine "Eg" is inputted through a torque converter "TC" to an input shaft "Input" of the automatic transmission and then subjected to a speed change by four planetary gear units and seven frictional elements before being outputted from an output shaft "Output".

Denoted by reference "OP" is an oil pump that is arranged coaxially with respect to a pump impeller of the torque converter "TC", so that upon operation of the engine "Eg", the oil pump "OP" is driven to compress a working fluid.

For controlling the engine "Eg" and the automatic transmission, there are employed an engine controller "ECU" 10 and an automatic transmission controller "ATCU" 20.

Denoted by numeral 30 is a control valve unit "CVU" 30 that, based on an output signal issued from automatic transmission controller "ATCU" 20, controls a hydraulic pressure applied to each of the frictional elements of the automatic transmission.

Engine controller "ECU" 10 and automatic transmission controller "ATCU" 20 are operatively connected through a controller area network (viz., CAN), so that various information and instruction signals are commonly used by the two controllers 10 and 20 through CAN.

Upon receiving engine torque representing signals from engine controller "ECU" 10, automatic transmission controller "ATCU" 20 calculates various parameters used for carrying out various speed changes instructed.

As shown, to engine controller "ECU" 10, there are connected an accelerator pedal depression sensor "APO" 1 that detects a degree by which an accelerator pedal is depressed or actuated by a driver and an engine speed sensor 2 that detects an engine speed of engine "Eg". Based on information signals from accelerator pedal depression sensor 1 and engine speed sensor 2, engine controller 10 controls a fuel injection rate and a throttle open degree of the engine "Eg" thereby to control the engine speed and engine torque.

To automatic transmission controller "ATCU" 20, there are connected a first turbine speed sensor 3 that detects a rotation speed of a first carrier "PC1", a second turbine speed sensor 4 that detects a rotation speed of a first ring gear "R1", an output shaft speed sensor 5 that detects a rotation speed of the output shaft of the transmission, and an inhibitor switch 6 that detects movement of a shift lever handled by the driver. Processing information signals from such sensors and switch, automatic transmission controller "ATCU" 20 carries out the following control when the transmission assumes D-range.

That is, in such D-range, based on both a vehicle speed "Vsp" calculated based on the speed of the output shaft "Output" detected by output shaft speed sensor 5 and an accelerator pedal depressed degree sensed by the accelerator pedal depression sensor "APO", a proper speed to be instructed is selected, and an instruction signal for the selected speed is issued to control valve unit "CVU" 30 to establish the selected speed by the automatic transmission.

To automatic transmission controller "ATCU" 20, there is further connected an eco-mode switch 7 that is movable by the driver between a normal position that allows through the two controllers 20 and 10 a fuel-efficient and maneuverable running of the associated vehicle and an eco-mode position that focuses through the controllers 20 and 10 on the best fuel efficiency of the associated vehicle.

In the following, a speed change gear mechanism arranged between input shaft "Input" and output shaft "Output" of the transmission will be described.

As shown in the drawing, first and second planetary gear sets "GS1" and "GS2" are arranged about an imaginary axis that extends along input and output shafts "Input, Output" of the transmission. A plurality of clutches "C1", "C2", and "C3" and brakes "B1", "B2", "B3" and "B4" are further arranged as frictional elements associated with first and/or second planetary gear set "GS1" and/or "GS2". Two one-way clutches "F1" and "F2" are associated with first and second planetary gear sets "GS1" and "GS2" respectively.

As will be described in detail in the following, first planetary gear set "GS1" comprises a first planetary gear unit "G1" and a second planetary gear unit "G2" and, second planetary gear set "GS2" comprises a third planetary gear unit "G3" and a fourth planetary gear unit "G4".

First planetary gear unit "G1" is of a single pinion type planetary gear unit which comprises a first sun gear "S1", a first ring gear "R1", first pinions "P1" each being meshed with both first sun gear "S1" and first ring gear "R1" and a first pinion carrier "PC1" holding first pinions "P1". Second planetary gear unit "G2" is also of a single pinion type planetary gear unit which comprises a second sun gear "S2", a second ring gear "R2", second pinions "P2" each being meshed with both second sun gear "S2" and second ring gear "R2" and a second pinion carrier "PC2" holding second pinions "P2".

Third planetary gear unit "G3" is also of a single pinion type planetary gear unit which comprises a third sun gear "S3", a third ring gear "R3", third pinions "P3" each being meshed with both third sun gear "S3" and third ring gear "R3" and a third pinion carrier "PC3" holding third pinions "P3". Fourth planetary gear unit "G4" is also of a single pinion type planetary gear unit which comprises a fourth sun gear "S4", a fourth ring gear "R4", fourth pinions "P4" each being meshed with both fourth sun gear "S4" and fourth ring gear "R4" and a fourth pinion carrier "PC4" holding third pinions "P4".

As shown, input shaft "Input" is connected to second ring gear "R2", so that a torque from engine "Eg" is inputted to second ring gear "R2" through torque converter "TC". Third pinion carrier "PC3" is connected to output shaft "Output", so that an output torque on output shaft "Output" is transmitted to drive road wheels (not shown) of the associated vehicle through a final gear (not shown).

Clutch "C1" is an input clutch that selectively establishes connection and disconnection between input shaft "Input" and a second connecting member "M2".

Clutch "C2" is a direct clutch that selectively establishes connection and disconnection between fourth sun gear "S4" and fourth pinion carrier "PC4".

Clutch "C3" is a H/LR clutch that selectively establishes connection and disconnection between third sun gear "S3" and fourth sun gear "S4". Between third sun gear "S3" and fourth sun gear "S4", there is arranged second one-way clutch "F2". Thus, when, with H/LR clutch kept released, fourth sun gear "S4" shows a rotation speed higher than that of third sun gear "S3", these two sun gears "S4" and "S3" are rotated independently showing respective rotation speeds. Under this condition, third planetary gear unit "G3" and fourth planetary gear unit "G4" take a condition wherein these two units "G3" and "G4" are connected through second connecting member "M2", so that these units "G3" and "G4" show respective gear ratios independently.

Brake "B1" is a front brake that selectively brakes rotation of first pinion carrier "PC1". One-way clutch "F1" is arranged in parallel with front brake "B1". Brake "B2" is a low brake that selectively brakes rotation of third sun gear "S3". Brake "B3" is a 2346 brake that selectively brakes rotation of a third connecting member M3 that connects first sun gear "S1" and second sun gear "S2". Brake "B4" is a reverse brake that selectively brakes rotation of fourth pinion carrier "PC4".

Figure 2:
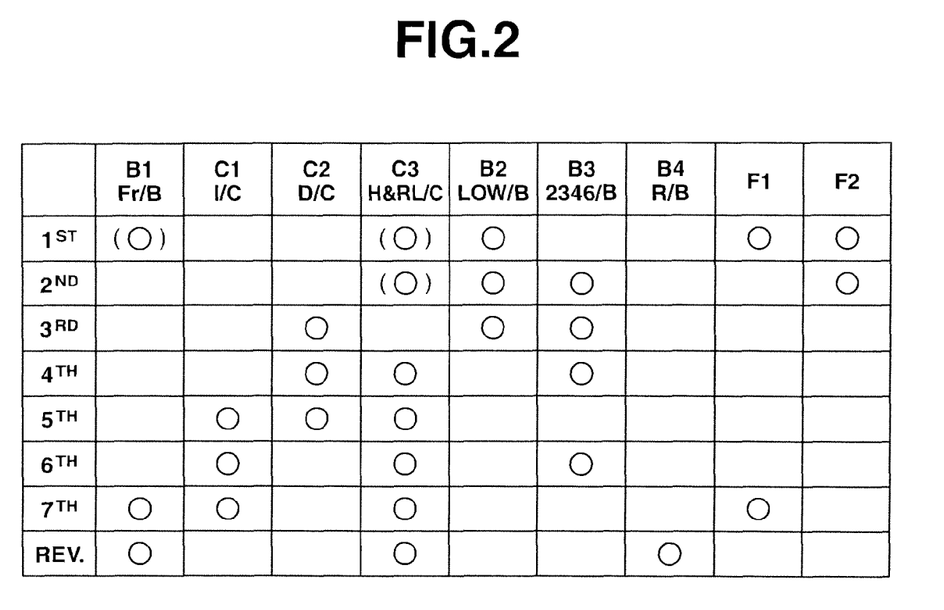
FIG. 2 is a table showing ON/OFF conditions of various frictional elements of the automatic transmission with respect to various speeds established by the transmission.

With the above-mentioned construction, the speed change gear mechanism can provide such speeds as shown in the table of FIG. 2. That is, by operating the frictional elements in such a manner as is shown in the table, seven speeds and one reverse are established by the automatic transmission.

In the table of FIG. 2, circle "O" indicates ON (viz., engaged) condition of the corresponding frictional element, and bracketed circle "(O)" indicates ON (viz., engaged) condition of the corresponding frictional element while a range is selected to make an engine brake possible.

That is, in case of $1^{st}$ speed, only low brake "B2" is engaged causing engagement of the two one-way clutches "F1" and "F2". In case of $2^{nd}$ speed, low brake "B2" and 2346 brake "B3" are engaged causing engagement of second one-way clutch "F2". In case of $3^{rd}$ speed, low brake "B2", 2346 brake "B3" and direct clutch "C2" are engaged. In this speed, none of first and second one-way clutches "F1" and "F2" is engaged. In case of $4^{th}$ speed, 2346 brake "B3", direct clutch "C2" and H/LR clutch "C3" are engaged. In case of $5^{th}$ speed, input clutch "C1", direct clutch "C2" and H/LR clutch "C3" are engaged. In case of $6^{th}$ speed, 2346 brake "B3", input clutch "C1" and H/LR clutch "C3" are engaged. In case of $7^{th}$ speed, front brake "B1", input clutch "C1" and H/LR clutch "C3" are engaged causing engagement of first one-way clutch "F1". In reverse mode, reverse brake "B4", front brake "B1" and H/LR clutch "C3" are engaged.

Figure 3:
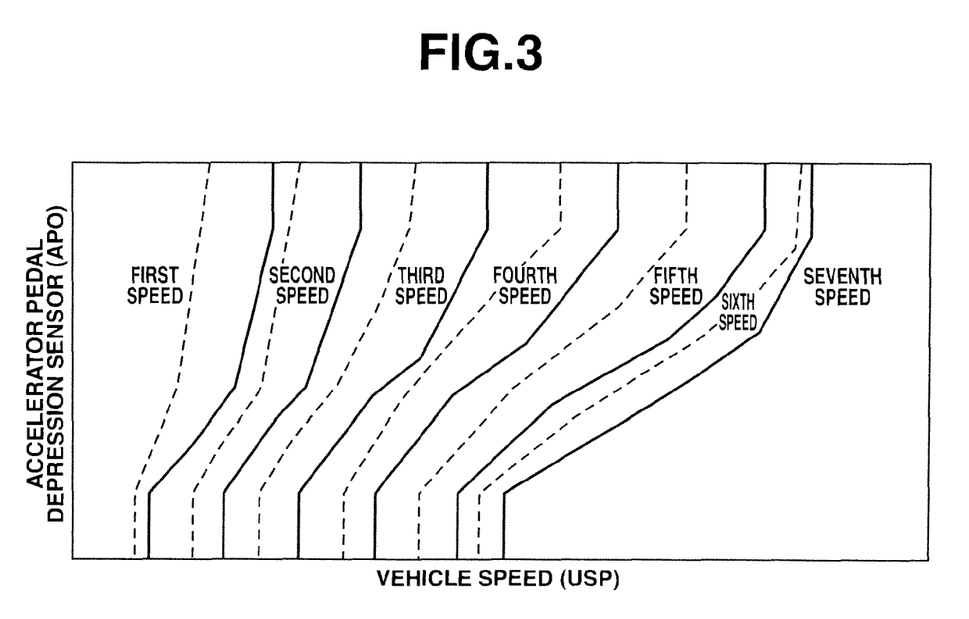
FIG. 3 is a shift map depicting a shift schedule set for the automatic transmission to which the control system of the invention is applied.

FIG. 3 is a shift map showing a shift schedule set for the automatic transmission to which the control system of the present invention is applied. The shift map is a map that shows proper shifts set for various speeds in accordance with both a vehicle speed and an accelerator pedal depressed degree. As is to known, the vehicle speed may be estimated by processing a rotation speed of a road wheel of an associated motor vehicle, and the accelerator pedal depressed degree may be replaced by a throttle open degree of the engine. As is seen from the shift map, each shift has a shift zone defined by shift lines, and when a drive point moves in the shift zone, a shift instruction is outputted. The drive point is determined based on both the rotation speed of output shaft "Output" which is detected by output shaft speed sensor 5 and the accelerator pedal depressed degree which is detected by accelerator pedal depression sensor "APO" 1.

Automatic transmission controller "ATCU" 20 has therein a shift control section that has the shift map installed therein. By comparing the drive point with the shift map, a desired shift is decided and an instruction for the decided desired shift is outputted from the shift control section. In practical use, in the shift map, there are provided both up-shift lines that are used for outputting an up-shift instruction when the drive point moves across from a lower speed shift zone to a higher speed shift zone and down-shift lines that are used for outputting a down-shift instruction when the drive point moves across from the higher speed shift zone to the lower speed shift zone. However, for ease of understanding, in the shift map of FIG. 3, only the up-shift lines are shown.

It is to be noted that in the shift map of FIG. 3, solid lines are those for a normal shift mode that allows a fuel-efficient and maneuverable running of the associated vehicle, and dotted lines are those for an eco-shift mode that focus on the best fuel efficiency of the associated vehicle. As is seen from the shift map, the shift lines for the eco-shift mode are set at a vehicle speed "USP" lower than that of the shift lines for the normal shift mode. That is, in the eco-shift mode, each up-shift is carried out at a vehicle speed lower than that of the corresponding up-shift in the normal shift mode. In other words, in the eco-shift mode, for saving a fuel, the associated motor vehicle is compelled to run keeping the engine speed in a relatively low range. When the normal shift mode is selected by the above-mentioned eco-mode switch 7, the shift lines for the normal shift mode are practically used. While, when the eco-shift mode is selected by the eco-mode switch 7, the shift lines for the eco-shift mode are practically used.

In the following, a learning control practically employed in the present invention will be described in detail with the aid of the drawings.

Figure 4:
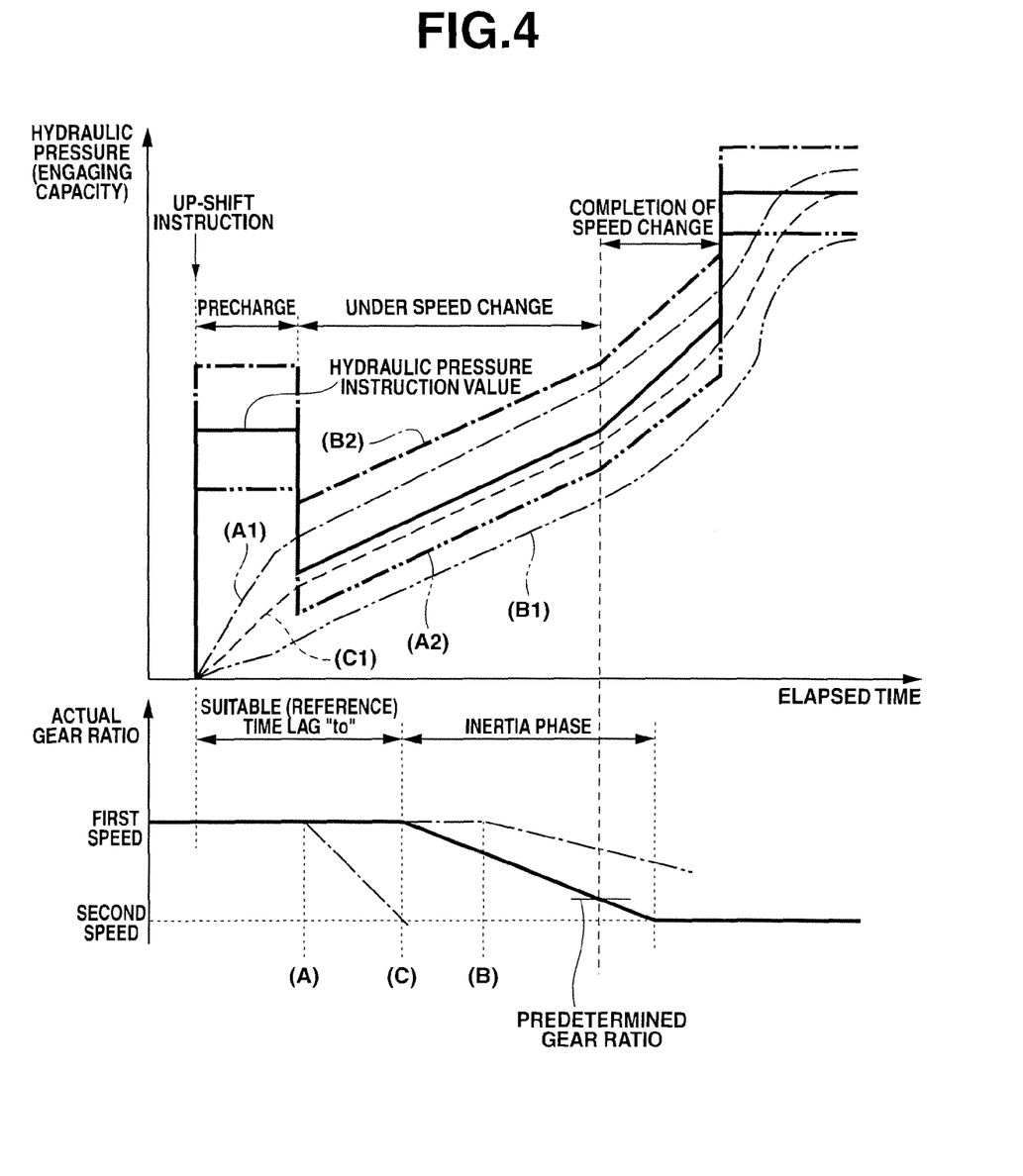
FIG. 4 is a time chart showing a change of engaging capacity of a friction element and that of an actual gear ratio during a time when an up-shift from first speed to second speed is carried out.

In FIG. 4, there are shown two time charts, which are a hydraulic pressure time chart shown in an upper side of the drawing and an actual gear ratio time chart shown in a lower side of the drawing.

That is, the hydraulic pressure time chart shown in the upper side of the drawing indicates an engaging capacity of a frictional element that varies when an up-shift is carried out from $1^{st}$ speed to $2^{nd}$ speed.

Figure 8:
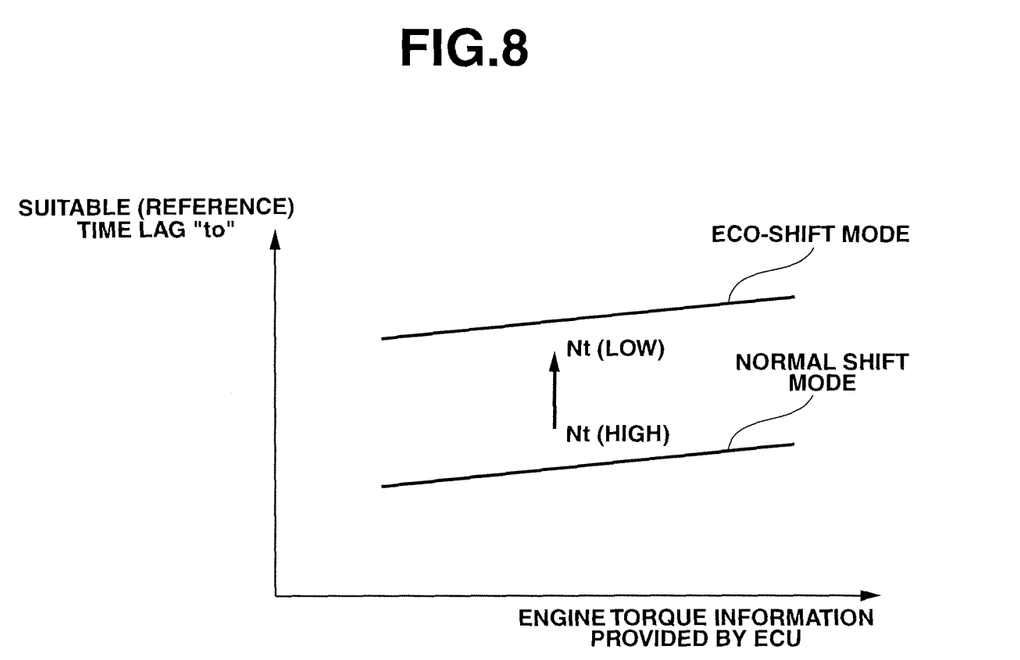
FIG. 8 is a time lag map practically used in the control system of the invention.

While, the actual gear ratio time chart shown in the lower side of the drawing indicates a change of the actual gear ratio that is induced due to the up-shift from $1^{st}$ speed to $2^{nd}$ speed. FIG. 8 is a time lag map practically employed in the control system of the invention.

As is seen from the time charts of FIG. 4, when instruction of up-shift from $1^{st}$ speed to $2^{nd}$ speed is issued, instruction for engaging 2346 brake "B3" is issued. Upon this, a precharge pressure instruction is issued for a given time to make a certain piston stroke. Thereafter, the engaging capacity of the corresponding frictional element is gradually increased. In the present invention, the gradient of rise of the engaging capacity is kept constant. However, if desired, the gradient of rise may be varied in accordance with then input torque, learning correction or the like.

When a certain time passes from the issuance of the up-shift instruction, the engaging capacity of 2346 brake "B3" starts to take place and thus the actual gear ratio of the transmission starts to change for the purpose of establishing the desired up-shift. The timing of such starting is called as "inertia phase start timing", and a period from the issuance of the up-shift instruction to the inertia phase start timing is called as "time lag". That is, due to existence of the time lag, changing of the actual gear ratio of the automatic transmission is delayed with respect to the time when the up-shift instruction is issued.

The time lag is a value that varies in accordance with a magnitude of an engine torque inputted to the transmission from the engine "Eg". Accordingly, a time lag map such as the map of FIG. 8 is prepared, which provides a suitable (or reference) time lag "to" in accordance with an engine torque signal issued from engine controller "ECU" 10.

Referring back to FIG. 4, the point indicated by the arrow "C" in the actual gear ratio time chart is the timing (or time) when the inertia phase starts in accordance with the suitable (or reference) time lag "to".

When a suitable (or reference) time lag "to" is looked up from the time lag map of FIG. 8 based on information on input torque, the suitable (or reference) time lag "to" and an actual time lag "t" are compared. If the actual time lag "t" differs from the suitable (or reference) time lag "to" by a value equal to or larger than a predetermined value "t1", it is estimated that an actual engaging capacity has not been suitably obtained against the instruction for a desired hydraulic pressure value. This is because the instruction for the needed hydraulic pressure value is just only a basic signal for preparing an electric current to energize a solenoid valve installed in control valve unit "CVU" 30, and thus, even if an exact electric current is fed to the solenoid valve, it is almost impossible to obtain a desired actual engaging capacity due to inevitable dimensional errors in plunger and spool, reduced thickness of clutch plates caused by long use, change of frictional coefficient of the clutch plates caused by long use and the like.

When the actual time lag "t" is smaller (or shorter) than the suitable (or reference) time lag "to", that is, when the inertia phase starts at the timing of (A) in the actual gear ratio time chart of FIG. 4, it is judged that an actual engaging capacity higher than the engaging capacity estimated by the instructed desired value has been established. When reference is made to the hydraulic pressure time chart of FIG. 4, the actual engaging capacity is indicated by a thinner dot-dash line (A1) against the instruction value for the hydraulic pressure indicated by a thicker solid line. In such case, the instruction value for the hydraulic pressure is reduced at a successive up-shift operation as is indicated by a thicker dot-dash line (A2). With such reduced instruction value (A2), the actual engaging capacity becomes a value as is indicated by a thinner dotted line (C1) that assures the suitable (or reference) time lag "to". That is, the suitable (or reference) time lag "to" is established.

If the actual time lag "t" is larger (or longer) than the suitable (or reference) time lag "to", that is, when the inertia phase starts at the time of (B) in the actual gear ratio time chart of FIG. 4, it can be judged that an actual engaging capacity lower than the engaging capacity estimated by the instructed desired value has been established. When reference is made to the hydraulic pressure time chart of FIG. 4, the actual engaging capacity is indicated by a thinner dot-dot-dash line (B1) against the instruction value for the hydraulic pressure indicated by the thicker solid line. In such case, the instruction value for the hydraulic pressure is increased at a successive up-shift operation as is indicated by a thicker dot-dash line (B2). With such increased instruction value (B2), the actual engaging capacity becomes a value as is indicated by the thinner dotted line (C1) that assures the suitable (or reference) time lag "to". That is, the suitable (or reference) time lag "to" is established.

In the following, explanation will be directed to a time lag map that constitutes a base for carrying out the above-mentioned learning control.

Figure 5:
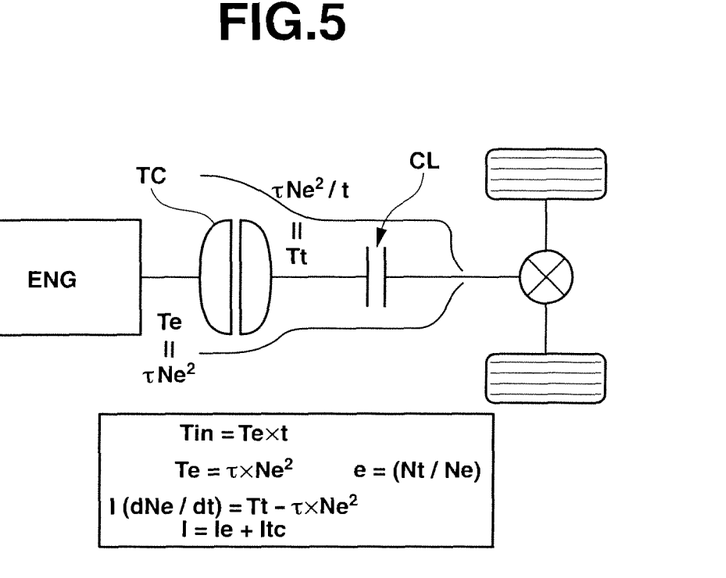
FIG. 5 is a schematic view of a motor vehicle having an automatic transmission to which the control system of the present invention is applied.
Figure 6:
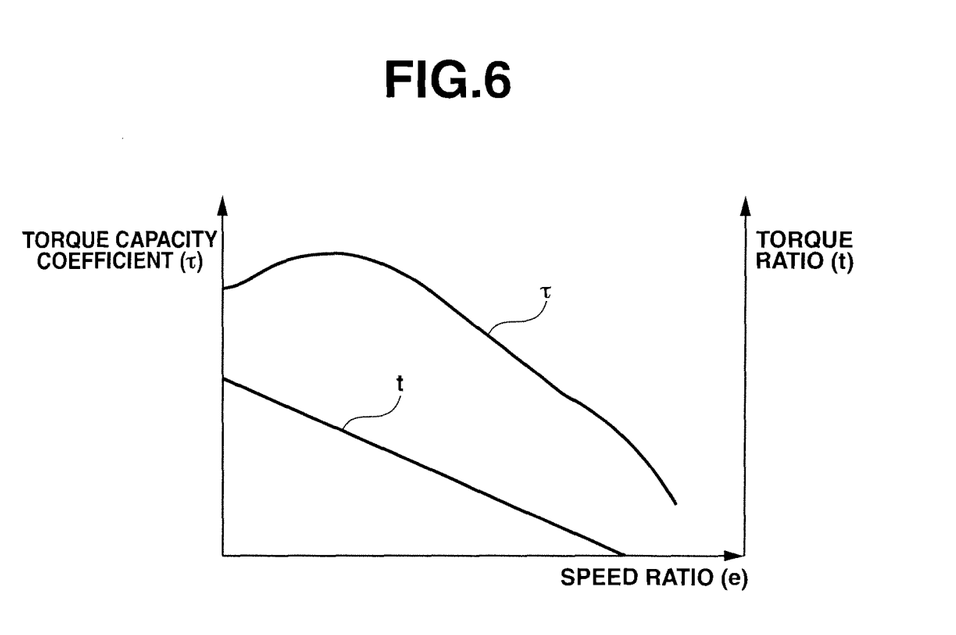
FIG. 6 is a characteristic graph of a torque converter showing the relationship between a speed ratio, a torque capacity coefficient and a torque ratio.

FIG. 5 is a schematic plan view of a motor vehicle having the automatic transmission to which the control system of the present invention is practically applied. FIG. 6 is a characteristic graph of a torque converter showing the relationship between a speed ratio, a torque capacity coefficient and a torque ratio.

As will be understood from FIG. 5, an engine torque outputted from engine "Eg" is amplified by torque converter "TC", and the torque thus amplified is transmitted through a cluster of frictional elements "CL" to drive road wheels.

If engine torque is represented by "Te", turbine torque is by "Tt", torque ratio of torque converter is by "t", engine inertia is by "Ie", torque converter inertia is by "Itc", speed ratio of torque converter is by "e" (=Nt/Ne), torque capacity coefficient is by "τ", turbine rotation speed (=output rotation speed of torque converter) is by "Nt", engine rotation speed is by "Ne" and input torque of the automatic transmission is by "Tin", the following three equations are established:

$$Tin = Te \times t \quad (1)$$

$$Te = \tau \times Ne^2 \quad (2)$$

$$(Ie+Itc) \times (dNe/dt) = Tt - \tau \times Ne^2 \quad (3)$$

For calculating the input torque "Tin" of the automatic transmission that constitutes a base for deriving the time lag, engine torque "Te" is read from output from engine controller "ECU" 10 and multiplied by the torque ratio "t" (which is provided based on the speed ratio "e" of the torque converter). As is seen from the equation (2), engine torque "Te" is proportional to both the torque capacity coefficient "τ" and the square of engine rotation speed "Ne", and as is seen from the equation (3), the turbine torque actually inputted to the automatic transmission has a value that is provided by subtracting, from the turbine torque "Tt", the inertia torque that corresponds to the variation of engine rotation speed. In other words, the turbine torque actually inputted to the automatic transmission is not the turbine torque outputted by the torque converter "TC".

When producing the time lag map, a suitable (or reference) time lag in case wherein the speed change is carried out in accordance with the normal shift mode is set by experiment or simulation by taking the effect of the inertia torque into consideration. The suitable (or reference) time lag is so set as to establish a speed for the desired speed change while suppressing a shift shock. However, as is seen from the shift map of FIG. 3, in case of using the eco-shift mode (indicated by dotted lines), the up-shift is carried out at a speed lower than that provided by the normal shift mode, that is, at a time when the turbine rotation speed "Nt" is relatively low and the speed ratio "e" of the torque converter is low. In such case, as is seen from the graph of FIG. 6, when the speed ratio "e" of the torque converter is low, the torque capacity coefficient "τ" shows a higher value, which means that the up-shift is made under a condition wherein increase in engine rotation speed "Ne" is not easily made.

If, in such case, automatic transmission controller "ATCU" 20 employs or processes a value that is obtained by just multiplying the engine torque "Te" by the torque ratio "t", the turbine torque "Tt" actually led to the automatic transmission becomes large as compared with a case wherein the torque capacity coefficient "τ" is small. This is because under the condition wherein increase in engine rotation speed "Ne" is not easily made, changes in engine rotation speed "Ne" do not occur so frequently and thus the inertia torque shows an unexpectedly low level. However, in such case, even when a friction element "CL" is fed with a hydraulic pressure instruction and thus the friction element assures a desired engaging capacity, the actual time lag "t" becomes larger than the suitable (or reference) time lag "to". In this case, the learning control tends to misunderstand that the actual engaging capacity is insufficient, and thus the learning control tends to erroneously carry out increase the hydraulic pressure value possessed by the hydraulic pressure instruction.

In order to avoid the above-mentioned undesired erroneous operation, according to the present invention, when the eco-shift mode is practically used, a specially prepared time lag map as shown in FIG. 8 is used. That is, as is seen from the graph of FIG. 8, the time lag map for the eco-shift mode is set to have a higher suitable (or reference) time lag "to" as compared with that for the normal shift mode.

Referring back to FIG. 7, there is shown a flowchart showing programmed operation steps executed by automatic transmission controller "ATCU" 20 employed in the present invention for carrying out the above-mentioned learning control.

Figure 7:
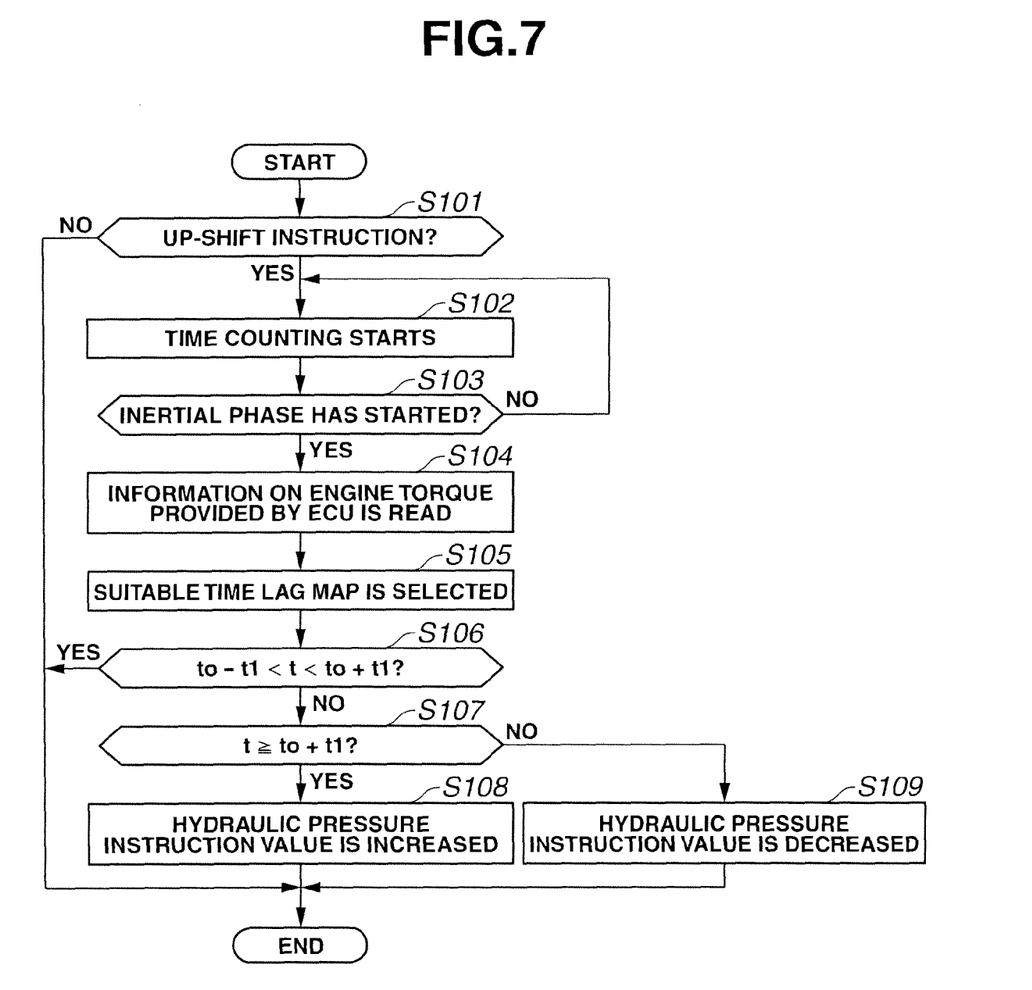
FIG. 7 is a flowchart showing programmed operation steps executed by a control unit employed in the present invention for carrying out a learning control.

At step S101, judgment is carried out as to whether an instruction for up-shift has been issued or not. If YES, that is, when instruction for up-shift has been issued, the operation flow goes to step S102, while if NO, that is, when instruction for up-shift has not been issued, the operation flow goes to END.

At step S102, counting of time from the time when the instruction for up-shift has been issued is started by a timer. Then, the operation flow goes to step S103. At this step S103, judgment is carried out as to whether an inertia phase has to started or not. If YES, that is, when the inertia phase has started, the operation flow goes to step S104. While, if NO, that is, when the inertia phase has not started yet, the operation flow goes back to step S102 for repeating the time counting. As has been mentioned hereinabove, the inertia phase start timing can be sensed by detecting that the actual gear ratio has shown a predetermined change.

At step S104, information on engine torque "Te" is read from output from engine controller "ECU" 10. Then, the operation flow goes to step S105.

At step S105, a time lag map suitable for the shift map currently used is selected. More specifically speaking, if, as is seen from the shift map of FIG. 3 and time lag map of FIG. 8, the normal shift mode as indicated by the solid lines has been kept selected, the time lag map suitable for the normal shift mode is selected.

While, if the eco-shift mode as indicated by the dotted lines has been kept selected, the time lag map suitable for the eco-shift mode is selected. Actually, as is seen from the time lag map of FIG. 8, the suitable (or reference) time lag "to" for the eco-shift mode gradually approaches the time lag for the normal shift mode as the turbine rotation speed "Nt" increases. That is, by using interpolation (or interpolation calculation) between the eco-shift mode and normal shift mode with respect to the turbine rotation speed "Nt", the suitable (or reference) time lag "to" for the eco-shift mode is decided. As the turbine rotation speed "Nt" lowers, the speed ratio "e" of the torque converter becomes small and the torque capacity coefficient "τ" becomes large. Accordingly, the interpolation is so made that as the turbine rotation speed "Nt" lowers, the suitable (or reference) time lag "to" becomes larger. With this unique interpolation, the suitable (or reference time) lag can be suitably obtained taking the torque capacity coefficient "τ" into consideration.

Referring back to the flowchart of FIG. 7, after step S105, the operation flow goes to step S106.

At this step S106, judgment is carried out as to whether or not the actual time lag "t" is within a predetermined range between a lower value "to−t1" and a higher value "to+t1". If YES, that is, the actual time lag "t" is within the predetermined range, the operation flow goes to END deciding no need of learning. While, if NO, that is, when the actual time lag "t" is not within the predetermined range, the operation flow goes to step S107.

At step S107, judgment is carried out as to whether or not the actual time lag "t" is equal to or larger than the higher value "to+t1". If YES, that is, when the actual time lag "t" is equal to or larger than the higher value "to+t1", the operation flow goes to step S108 judging that the actual engaging capacity is low against the instruction for a desired hydraulic pressure value. If NO, that is, when the actual time lag "t" is not equal to nor larger than the higher value "to+t1", the operation flow goes to step S109 judging that the actual engaging capacity is high against the instruction for the desired hydraulic pressure value.

At step S108, correction by learning control is carried out in a manner to cause the instruction to have a higher hydraulic pressure value.

At step S109, correction by learning control is carried out in a manner to cause the instruction to have a lower hydraulic pressure value.

If desired, the correction by learning control may be so made that the fixed value previously set is varied step by step, or varied by using a value that is set in accordance with a difference between the actual time lag and the suitable (or reference) time lag.

As is described hereinabove, in the present invention, there are arranged an engine "EG", a torque converter "TC", an automatic transmission that establishes $2^{nd}$ speed (given speed stage) by engaging 2346 brake "B3" (frictional element), an actual time lag measuring means (viz., steps S102 and S103) that measures an actual time lag from the time when a speed change instruction for $2^{nd}$ speed (given speed stage) is issued to the time when the gear ratio of the automatic transmission starts to change for the purpose of establishing $2^{nd}$ speed, an automatic transmission controller "ATCU" 20 (or torque detecting means) that receives information on engine torque "Te" from the engine controller "ECU" 10, a time lag map that shows a relation between the detected engine torque and a suitable (or reference) time lag, a learning correction means (viz., steps S106, S107, S108 and S109) that corrects, by learning control, the instruction value for the hydraulic pressure led to the 2346 brake "B3" in a manner to cause the actual time lag to have the same value as the suitable (or reference) time lag, a normal shift map that shows shift lines of a normal shift mode that are set to issue a speed change instruction for $2^{nd}$ speed (given speed stage) in accordance with a vehicle speed and an accelerator pedal depressed degree, an eco-shift map that shows shift lines of eco-shift mode that are set to issue the speed change instruction for $2^{nd}$ speed at a lower vehicle speed than the normal shift mode, a shift map switching means (viz., eco-mode switch 7) that switches the shift map from the normal shift map to the eco-shift map when a predetermined condition is established or a given switch operation is effected by a driver, and a time lag map correcting means (viz., step S105) that, when the eco-shift map is selected by the switching, corrects the contents of the time lag map in such a manner as to make the suitable (or reference) time lag larger as the rotation speed "Nt" of the turbine of the torque converter lowers.

That is, when the eco-shift map is selected, the speed change control is carried out with the timing that causes a higher torque capacity coefficient "τ", and thus, the inertia torque is small as compared with that in the case of selecting the normal shift map, which means feeding the automatic transmission with a larger torque and thus makes the actual time lag larger. As a result, a possibility arises where although the actual engaging capacity intended by the hydraulic pressure instruction value is proper, judgment is so made that the actual engaging capacity is low, which means erroneous learning. However, in case of using the eco-mode map, the correction is so made that the suitable (or reference) time lag is made larger as the turbine rotation speed "Nt" lowers, and thus, the above-mentioned erroneous learning is suppressed, which means suppression of undesired shift shock.

It is to be noted that in case of using the eco-shift map, preference is given to fuel saving not to maneuverability, and thus, even if the inertia phase start timing shows somewhat delay, it never provides the driver with uncomfortable feeling.

In the following, modifications of the present invention will be described.

In the above, the control system of automatic transmission of the present invention is concretely described. If desired, modifications may be applied to the above-mentioned control system so long as they don't deviate from the scope of the invention.

In the above description, explanation is directed to the up-shift from $1^{st}$ speed to $2^{nd}$ speed. Of course, the concept of the present invention is applicable to other up-shifts.

In the above description, explanation is directed to a case wherein the up-shift is carried out by engaging one frictional element. Of course, the concept of the present invention is applicable to a case wherein the up-shift is carried out by so-called change over shifting wherein one frictional element is disengaged while the other frictional element is engaged.

In the above description, explanation is directed to a case wherein the instruction value for the hydraulic pressure is simply increased or decreased by the learning control. However, if desired, increase and/or decrease of the instructed value for the hydraulic pressure may be gradually made by the learning control. In other words, the increase and/or decrease gradient of the instructed value may be subjected to the learning control.

In the above description, explanation is directed to a case wherein when the eco-shift map is selected by the switching, the suitable (or reference) time lag "to" is determined in accordance with the turbine rotation speed "Nt" with the aid of the interpolation calculation. However, if desired, the suitable (or reference) time lag "to" may be determined in accordance with an increasing or decreasing rate of the engine rotation speed.

More specifically speaking, the torque capacity coefficient "τ" varies in accordance with the speed ratio of the torque converter, and thus, easiness in rotation of the engine is varied. That is, between a case wherein the engine can easily rotate and a case wherein the engine can not easily rotate, the increasing (or decreasing) rate of the engine rotation speed varies, which means variation of the inertia torque, that is, variation of the torque actually fed to the automatic transmission.

Accordingly, an arrangement may be employed wherein by using an engine rotation speed increasing rate detecting means, the engine rotation speed increasing rate is detected, and by using a time lag map correcting means, the suitable (or reference) time lag of the time lag map is so corrected as to show a larger value as the detected engine rotation speed increasing rate reduces. With the correction of the suitable (or reference) time lag in accordance with the engine rotation speed increasing rate, the torque actually led into the automatic transmission can be accurately grasped, and thus, undesired erroneous learning can be suppressed.

The entire contents of Japanese Patent Application 2009-262726 filed Nov. 18, 2009 are incorporated herein by reference.

Although the invention has been described above with reference to the embodiment of the invention, the invention is not limited to such embodiment as described above. Various modifications and variations of such embodiment may be carried out by those skilled in the art, in light of the above description.

What is claimed is:

1. A control system for controlling an automatic transmission that is mounted in a motor vehicle and receives a torque from an engine through a torque converter, the automatic transmission being capable of establishing a given speed stage by engaging a given frictional element, the control system comprising:
an actual time lag measuring section that measures an actual time lag from a time when a speed change instruction for the given speed stage is issued to a time when a gear ratio of the automatic transmission starts to change for establishing the given speed stage;
a torque detecting section that detects the torque from the engine;
a time lag map that provides a suitable time lag in accordance with the detected torque from the engine;
a learning correction section that corrects, by learning control, an instruction value for a hydraulic pressure led to the frictional element so as to cause the actual time lag to have the same value as the suitable time lag; and
a time lag map correcting section that corrects the suitable time lag in accordance with an operation condition of the vehicle.

2. A control system as claimed in claim 1, in which the time lag map correcting section corrects the suitable time lag in accordance with a rotation speed of a turbine of the torque converter.

3. A control system as claimed in claim 2, in which the time lag map correcting section corrects the suitable time lag such that when the rotation speed of the turbine of the torque converter is low, the suitable time lag shows a larger value than that shown when the rotation speed of the turbine of the torque converter is high.

4. A control system as claimed in claim 1, in which the time lag map correcting section corrects the suitable time lag in accordance with an increasing rate of rotation speed of the engine.

5. A control system as claimed in claim 4, in which the time lag map correcting section corrects the suitable time lag such that when the increasing rate of the rotation speed of the engine is low, the suitable time lag shows a larger value than that shown when the increasing rate of the rotation speed of the engine is high.

6. A control system as claimed in claim 1, in which the time lag map correcting section comprises:
a normal shift map that shows shift lines of a normal shift mode that are set to issue a speed change instruction for the given speed stage in accordance with a vehicle speed and an accelerator pedal depressed degree;
an eco-shift map that shows shift lines of an eco-shift mode that are set to issue the speed change instruction for the given speed stage at a lower vehicle speed than the normal shift mode;
a shift map switching section that switches the shift map from the normal shift map to the eco-shift map when a predetermined condition is established; and
a correcting section that, when the eco-shift map is selected by switching, corrects the contents of the time lag map such that when the rotation speed of a turbine of the torque converter is low, the suitable time lag shows a larger value than that shown when the rotation speed of the turbine of the torque converter is high.

7. A control system as claimed in claim 6, in which the shift map switching section switches from the normal shift map to the eco-shift map when a driver carries out a predetermined switching action.

8. A control system as claimed in claim 6, in which the actual time lag measuring section measures the actual time lag by counting a time elapsed from the time when the speed change instruction for the given speed stage issues to a time when an inertia phase of the given speed stage appears.

9. A control system as claimed in claim 6, in which the learning correction section increases the instruction value for the hydraulic pressure led to the frictional element when the actual time lag is equal to or larger than a predetermined value and decreases the instruction value when the actual time lag is smaller than the predetermined value.

10. A control system as claimed in claim 9, in which the predetermined value for the actual time lag is a value that is the sum of a value of the suitable time lag and a predetermined value.

11. A control system as claimed in claim 1, in which the lag map correcting section comprises:
an engine rotation speed increasing rate detecting section that detects an increasing rate of the engine rotation speed; and
a correcting section that corrects the contents of the time lag map such that when the detected engine rotation speed increasing rate is small, the suitable time lag shows a larger value than that shown when the detected engine rotation speed increasing rate is large.

12. A control system for controlling an automatic transmission that is mounted in a motor vehicle and receives a torque from an engine through a torque converter, the automatic transmission being capable of establishing a given speed stage by engaging a given frictional element, the control system comprising:
an actual time lag measuring section that measures an actual time lag from a time when a speed change instruction for the given speed stage is issued to a time when a gear ratio of the automatic transmission starts to change for establishing the given speed stage;
a torque detecting section that detects the torque from the engine;
a time lag map that provides a suitable time lag in accordance with the detected torque from the engine;
a learning correction section that corrects, by learning control, an instruction value for the hydraulic pressure led to the frictional element so as to cause the actual time lag to have the same value as the suitable time lag;
a normal shift map that shows shift lines of a normal shift mode that are set to issue a speed change instruction for the given speed stage in accordance with a vehicle speed and an accelerator pedal depressed degree;
an eco-shift map that shows shift lines of an eco-shift mode that are set to issue the speed change instruction for the given speed stage at a lower vehicle speed than the normal shift mode;
a shift map switching section that switches the shift map from the normal shift map to the eco-shift map when a predetermined condition is established; and
a correcting section that, when the eco-shift map is selected by switching, corrects the contents of the time lag map such that when the rotation speed of a turbine of the torque converter is low, the suitable time lag shows a larger value than that shown when the rotation speed of the turbine of the torque converter is high.

13. A control system for controlling an automatic transmission that is mounted in a motor vehicle and receives a torque from an engine through a torque converter, the automatic transmission being capable of establishing a given speed stage by engaging a given frictional element, the control system comprising:

an actual time lag measuring section that measures an actual time lag from a time when a speed change instruction for the given speed stage is issued to a time when a gear ratio of the automatic transmission starts to change for establishing the given speed stage;

a torque detecting section that detects the torque from the engine;

a time lag map that provides a suitable time lag in accordance with the detected torque from the engine;

a learning correction section that corrects, by learning control, an instruction value for the hydraulic pressure led to the frictional element so as to cause the actual time lag to have the same value as the suitable time lag;

an engine rotation speed increasing rate detecting section that detects an increasing rate of the engine rotation speed; and a correcting section that corrects the contents of the time lag map such that when the detected engine rotation speed increasing rate is small, the suitable time lag shows a larger value than that shown when the detected engine rotation speed increasing rate is large.

* * * * *